United States Patent
Bin-Nun et al.

(10) Patent No.: US 9,641,702 B2
(45) Date of Patent: May 2, 2017

(54) METHODS AND SYSTEMS OF GENERATING A LENTICULAR ARTICLE USING A PRINTING BLANKET

(71) Applicant: HumanEyes Technologies Ltd., Jerusalem (IL)

(72) Inventors: Shahar Bin-Nun, Har-Adar (IL); Ben Denon, Tzur-Yigal (IL); Anton Bar, Jerusalem (IL)

(73) Assignee: HumanEyes Technologies Ltd., Neve Ilan (IL)

( * ) Notice: Subject to any disclaimer, the term of this patent is extended or adjusted under 35 U.S.C. 154(b) by 220 days.

(21) Appl. No.: 14/395,846

(22) PCT Filed: Apr. 25, 2013

(86) PCT No.: PCT/IL2013/050359
§ 371 (c)(1),
(2) Date: Oct. 21, 2014

(87) PCT Pub. No.: WO2013/160900
PCT Pub. Date: Oct. 31, 2013

(65) Prior Publication Data
US 2015/0301234 A1    Oct. 22, 2015

Related U.S. Application Data

(60) Provisional application No. 61/637,878, filed on Apr. 25, 2012.

(51) Int. Cl.
| H04N 1/00 | (2006.01) |
| B41M 3/06 | (2006.01) |
| B41C 1/12 | (2006.01) |
| G02B 27/22 | (2006.01) |
| G02B 3/00 | (2006.01) |

(52) U.S. Cl.
CPC .......... *H04N 1/00201* (2013.01); *B41C 1/12* (2013.01); *B41M 3/06* (2013.01); *G02B 3/005* (2013.01); *G02B 27/2214* (2013.01)

(58) Field of Classification Search
None
See application file for complete search history.

(56) References Cited

U.S. PATENT DOCUMENTS 6,244,176 B1 * 6/2001 Sonobe .................... B41F 7/02
101/177
7,149,035 B2 * 12/2006 Goggins ................ G03B 35/24
359/619

(Continued)

FOREIGN PATENT DOCUMENTS

| CN | 101301830 | 11/2008 |
| CN | 101846879 | 9/2010 |

(Continued)

OTHER PUBLICATIONS

Communication Pursuant to Article 94(3) EPC Dated May 2, 2016 From the European Patent Office Re. Application No. 13728536.7.

(Continued)

*Primary Examiner* — Scott A Rogers

(57) ABSTRACT

A method for a production of a lenticular image. The method comprises feeding a lenticular printing substrate having a corrugated side and a printing side into a digital printing press, feeding at least one nontransparent ink to set a substantially nontransparent layer on a printing blanket of the printing press, feeding a plurality of colored inks to set an interlaced color image layer on top of the substantially nontransparent layer on the printing blanket, and printing with the printing blanket onto the printing side.

16 Claims, 10 Drawing Sheets

(56) References Cited

U.S. PATENT DOCUMENTS

| | | | |
|---|---|---|---|
| 7,153,047 B2 * | 12/2006 | Goggins | G03B 21/625 359/619 |
| 7,593,132 B2 * | 9/2009 | Bast | B41J 29/393 347/2 |
| 7,898,737 B2 * | 3/2011 | Spiro | G02B 3/005 359/454 |
| 2003/0011824 A1 * | 1/2003 | Pilu | G02B 3/005 358/3.06 |
| 2004/0095648 A1 | 5/2004 | McCannel et al. | |
| 2010/0245926 A1 | 9/2010 | Blum | |
| 2011/0116058 A1 * | 5/2011 | Ota | G02B 27/2214 355/22 |
| 2011/0199595 A1 | 8/2011 | Horn | |
| 2012/0127497 A1 * | 5/2012 | Zomet | A61B 8/463 358/1.9 |

FOREIGN PATENT DOCUMENTS

| | | |
|---|---|---|
| EP | 2295245 | 3/2011 |
| GB | 2484380 | 4/2012 |
| JP | 2006-043905 | 2/2006 |
| JP | 2007-535865 | 12/2007 |
| JP | 2008-033204 | 2/2008 |
| JP | 2011-025444 | 2/2011 |
| WO | WO 2005/112431 | 11/2005 |
| WO | WO 2011/086558 | 7/2011 |
| WO | WO 2013/160900 | 10/2013 |

OTHER PUBLICATIONS

International Preliminary Report on Patentability Dated Nov. 6, 2014 From the International Bureau of WIPO Re. Application No. PCT/IL2013/050359.

International Search Report and the Written Opinion Dated Oct. 4, 2013 From the International Searching Authority Re. Application No. PCT/IL2013/050359.

Notification of Office Action and Search Report Dated Sep. 14, 2016 From the State Intellectual Property Office of the People's Republic of China Re. Application No. 201380021521.9. (9 Pages).

Notice of Reason for Rejection Dated Jan. 20, 2017 From the Japan Patent Office Re. Application No. 2015-507663 and Its Translation Into English.

* cited by examiner

METHODS AND SYSTEMS OF GENERATING A LENTICULAR ARTICLE USING A PRINTING BLANKET

RELATED APPLICATIONS

This application is a National Phase of PCT Patent Application No. PCT/IL2013/050359 having International filing date of Apr. 25, 2013, which claims the benefit of priority under 35 USC §119(e) of U.S. Provisional Patent Application No. 61/637,878 filed on Apr. 25, 2012. The contents of the above applications are all incorporated by reference as if fully set forth herein in their entirety.

FIELD AND BACKGROUND OF THE INVENTION

The present invention, in some embodiments thereof, relates to lenticular printing and, more particularly, but not exclusively, to methods and systems of enhancing lenticular printing processes and lenticular printing articles.

Lenticular printing is a technology in which a lenticular lens is used to produce lenticular images with an illusion of depth or object(s) motion as the lenticular image is viewed from different angles. This technology was created in the 1940s but has evolved in recent years to show more motion and increased depth.

In a common color printing process, a lens material which comes in a roll or a sheet is fed through an offset printing system at high speed. The offset printing system transfers an inked color image (offset) from a plate to a rubber blanket, then to the roll or the sheet.

During the last years, in order to remove the dependency in printing plates, digital printing systems have been adapted for lenticular color printing. In a digital press printing process inks are printed on top of each other to produce different hues. For example, green results from printing yellow and cyan inks on top of each other. In process color printing, a screened image, or halftone for each ink color is printed in succession. The screen grids are set at different angles, and the dots therefore create tiny rosettes, which, through a kind of optical illusion, appear to form a continuous-tone image. Halftoning can be viewed by examining a printed picture under magnification.

SUMMARY OF THE INVENTION

According to some embodiments of the present invention, there is provided a method for a production of a lenticular image. The method comprises feeding a lenticular printing substrate having a corrugated side and a printing side into a digital printing press, feeding at least one nontransparent ink to set a substantially nontransparent layer on a printing blanket of the printing press, feeding a plurality of colored inks to set an interlaced color image layer on top of the substantially nontransparent layer on the printing blanket, and printing with the printing blanket in a single impression operation onto the printing side.

Optionally, the method further comprises feeding at least one colored ink to set a lenticular article back image layer on the printing blanket, the feeding at least one colored ink is performed to set the substantially nontransparent layer on top of the lenticular article back image layer.

Optionally, the method further comprises feeding at least one coating material to set a coating layer on top of the interlaced color image layer on the printing blanket.

Optionally, the feeding a plurality of colored inks comprises feeding the plurality of colored inks to form a cyan color component layer, a magenta color component layer, a yellow color component layer, and a black color component layer on top of the substantially nontransparent layer on the printing blanket.

Optionally, the feeding a plurality of colored inks comprises feeding the plurality of colored inks to form a red color component layer, a green color component layer, and a blue color component layer on top of the substantially nontransparent layer on the printing blanket.

Optionally, the feeding plurality of colored inks comprises feeding a cyan color ink to set a cyan colored halftone pattern having a screen angle of about 15 degrees on the printing blanket, feeding a magenta color ink to set a magenta colored halftone pattern having a screen angle of about 75 degrees on the printing blanket, feeding a yellow color ink to set a yellow colored halftone pattern having a screen angle of about 30 degrees on the printing blanket, and feeding a black color ink to set a black colored halftone pattern having a screen angle of about 52.5 degrees on the printing blanket; wherein the screen angle is set in relation to a longitudinal axis of a lens of the lenticular printing substrate.

Optionally, the feeding a plurality of colored inks comprises mapping a plurality of distortions in a laser pattern projected on the printing blanket, calculating printing instructions for performing the feeding a plurality of colored inks so that the interlaced color image layer having a plurality of image strips with a variable location and width set according to the plurality of distortions.

Optionally, the lenticular printing substrate is a lenticular array having a plurality of lenses.

According to some embodiments of the present invention, there is provided a lenticular article that comprises a lenticular printing substrate having a corrugated side and a printing side, an interlaced color image printed on top of the printing side with a digital press, a substantially nontransparent layer printed on top of the interlaced color image with the digital press, and a lenticular article back image printed on top of the substantially nontransparent layer with the digital press.

Optionally, the lenticular printing substrate having a pitch of 75 lines per inch (LPI).

According to some embodiments of the present invention, there is provided a digital printing press for a production of a lenticular image. The printing press comprises a printing blanket, a printing substrate conveying unit which conveys a lenticular printing substrate having a corrugated side and a printing side in front of the printing blanket, and an ink feeding unit which feeds at least one nontransparent ink to set a substantially nontransparent layer on a printing blanket of the printing press and feeds a plurality of colored inks to set an interlaced color image layer on top of the substantially nontransparent layer on the printing blanket. The printing blanket is used to print the interlaced color image layer and the substantially nontransparent layer onto the printing side.

According to some embodiments of the present invention, there is provided a lenticular article for a production of a lenticular image that comprises a lenticular printing substrate having a corrugated side and a printing side and an interlaced color image which combines a cyan colored halftone pattern, a magenta colored halftone pattern, a yellow colored halftone pattern, and a black colored halftone pattern respectively having a screen angle of about 15 degrees, about 75 degrees, about 30 degrees and about 52.5 degrees. The screen angle is set in relation to a longitudinal axis of a lens of the lenticular printing substrate.

According to some embodiments of the present invention, there is provided a method of generating lenticular article. The method comprises feeding a lenticular printing substrate having a corrugated side and a printing side into a printing press with a printing blanket, feeding a cyan color ink to set a cyan colored halftone pattern having a screen angle of about 15 degrees on the printing blanket, feeding a magenta color ink to set a magenta colored halftone pattern having a screen angle of about 75 degrees on the printing blanket, feeding a yellow color ink to set a yellow colored halftone pattern having a screen angle of about 30 degrees on the printing blanket, and feeding a black color ink to set a black colored halftone pattern having a screen angle of about 52.5 degrees on the printing blanket. The screen angle is set in relation to a longitudinal axis of a lens of the lenticular printing substrate.

According to some embodiments of the present invention, there is provided a method of adapting a lenticular image. The method comprises mapping a plurality of distortions in a laser pattern projected on a printing blanket of a digital printing press, calculating printing instructions for printing an interlaced color image on a lenticular printing substrate having a plurality of lenses, the interlaced color image with a plurality of image strips adapted to the plurality of lenses and a variable width set according to the plurality of distortions, using the printing press for printing the interlaced color image according to the printing instructions, and attaching the interlaced color image to a lenticular array having a uniform pitch.

According to some embodiments of the present invention, there is provided a lenticular article having a lenticular printing substrate having a corrugated side with a uniform pitch and a back side and an interlaced color image having a plurality of image strips with different locations and widths selected according to a plurality of distortions in a laser pattern projected on a printing blanket of a printing press used for printing the interlaced color image. The interlaced color image is attached to the back side.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
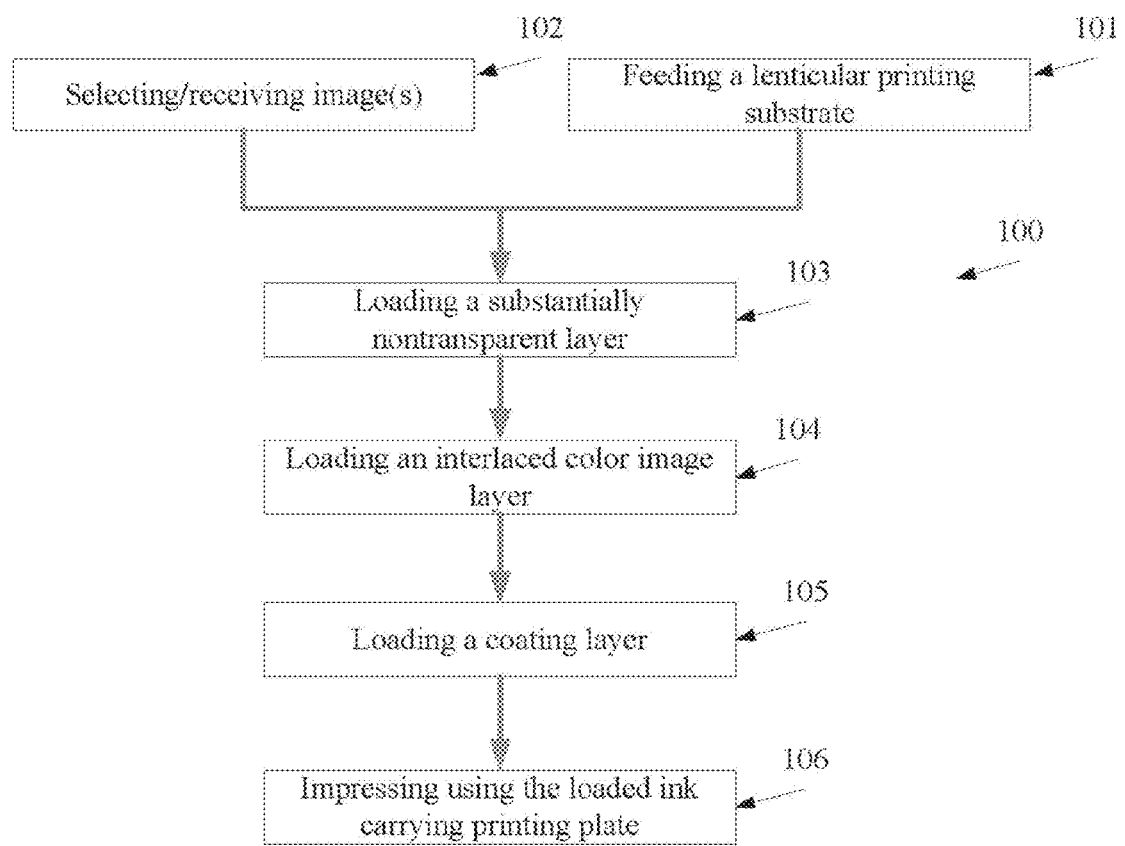
FIG. 1 is a flowchart of a method for a production of a lenticular article in a process in which a lenticular printing substrate is printed with an interlaced color image, a substantially nontransparent layer, and optionally a coating layer by a single impression operation of a printing blanket of a digital printing press, according to some embodiments of the present invention.

The present invention, in some embodiments thereof, relates to lenticular printing and, more particularly, but not exclusively, to methods and systems of enhancing lenticular printing processes and lenticular printing articles.

According to some embodiments of the present invention, there are provided methods and systems for a production of a lenticular image in a process in which a lenticular printing substrate is printed with an interlaced color image, a substantially nontransparent layer, and optionally a back image, by a single impression operation of a printing blanket of a digital printing press. In an exemplary method, a lenticular printing substrate having a corrugated side and a printing side is fed into a digital printing press. Then, one or more nontransparent ink materials are fed to set a substantially nontransparent layer on a printing blanket of the digital printing press. Then, colored inks are fed to set an interlaced color image layer on top of the substantially nontransparent layer on the printing blanket. This allows printing with the printing blanket onto the printing side of the lenticular printing substrate in a single impression operation. Optionally, coating materials are fed to set a coating layer on top of the interlaced color image layer. This allows direct coupling between the interlaced color image and the lenticular printing substrate. Optionally, colored inks are fed to set a back color image layer on the printing blanket before the substantially nontransparent layer is set on the printing blanket. In such manner, a duplex lenticular article having visual data printed on both sides may be created by a single impression operation of a printing blanket.

According to some embodiments of the present invention, there are provided methods and systems of generating lenticular article by setting a number of halftone patterns sublayers aligned according to a certain set of angles on a printing blanket. In use, a lenticular printing substrate having a corrugated side and a printing side is fed into a printing press with a printing blanket. Then, a cyan color ink is fed to set a cyan colored halftone pattern having a screen angle of about 15 degrees on the printing blanket, a magenta color ink is fed to set a magenta colored halftone pattern having a screen angle of about 75 degrees on the printing blanket, a yellow color ink is fed to set a yellow colored halftone pattern having a screen angle of about 30 degrees on the printing blanket, and a black color ink is fed to set a black colored halftone pattern having a screen angle of about 52.5 degrees on the printing blanket. These screen angles are set in relation to a longitudinal axis of a lens of the lenticular printing substrate. The order of the setting of the colored halftone patterns may vary.

According to some embodiments of the present invention, there are provided methods and systems of adapting an interlaced color image according to known distortions of a laser module of the printing press that is used for the printing thereof. The adaptation is optionally an adjustment of the width and location of strips of the interlaced color image which are assigned to fit the pitch of a used lenticular printing substrate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart 100 of a method for a production of a lenticular article in a process in which a lenticular printing substrate is printed with an interlaced color image, a substantially nontransparent layer, and optionally a coating layer by a single impression operation of a printing blanket, optionally a reusable printing blanket, of a printing press, according to some embodiments of the present invention. The process optionally allows accurate, automatic, generation, which optionally includes duplex printing, of a lenticular article using a commercially available digital press and/or digital offset printer, such as HP Indigo™ Digital Press printer, a printing interface, and/or an additional printing unit.

As the lenticular image is generated by a single impression operation of the printing blanket of the printing press common lenticular printing artifacts, such as ghosting, banding, moiré, and/or undesired variable pitch may be avoided and/or having their prevalence reduced. This, in addition to the ability to avoid multiple impression operations on each printed area of the lenticular printing substrate, reduces the production cost per lenticular article and the waste of lenticular articles having a low quality which is insufficient for commercial usages.

First, as shown at 101, a lenticular printing substrate, such as a lenticular array is being fed into a printing press, optionally as known in the art. The lenticular printing substrate has a front side, also referred to as a corrugated side, optionally defined by a certain pitch, and a printing side also referred to as a back side.

During the printing process, the lenticular printing substrate is conveyed to be positioned in front of the printing blanket for facilitating the impression of one or more images thereon, for example as described below.

As shown at 102, one or more images for printing are selected and/or received. For example an interlaced color image that includes a plurality of image strips taken from a plurality of different source images is received.

Now, as shown at 103-105, the printing blanket is prepared for an impression operation.

First, as shown at 103, the printing blanket is fed with one or more nontransparent ink materials to set, also referred to herein as to load, a substantially nontransparent layer thereon. The substantially nontransparent layer is optionally a monotonic nontransparent layer having a uniform color, such as white, grey, silver or black, with a low optical transparency coefficient. The low optical transparency coefficient of the layer is optionally set so that an image located behind the layer does not cause a ghosting effect or a ghosting effect with a high visibility (from a distance of less than 0.5 meters) when an image located in front of the layer is viewed. Optionally, a number of monotonic nontransparent layers are used, for example a white layer, a silver layer, and a white layer. The substantially nontransparent layer is optionally a multicolor nontransparent layer where colors, hues and/or intensities of the nontransparent layer may vary. Optionally, colors, hues and the intensity are dynamically set according to an image processing of the received image(s), for example an interlaced color image and/or a back image that is about to be printed, for example as described below. This dynamic setting may provide a better separation between the interlaced color image and the back image and/or reduces artifacts such as darkening and/or transparency of the interlaced color imaged as an outcome of the back image.

Now, as shown at 104, a plurality of colored ink materials in a plurality of primary colors are fed to set an interlaced color image layer on top of the substantially nontransparent layer on the printing blanket. The width of strips of the interlaced color image is optionally adapted to the pitch of the lenticular printing substrate. The interlaced color image layer is optionally set according to the received interlaced color image. Optionally each primary color of the received image is added as a separate halftone pattern sub-layer, also referred to as a halftone screen or screening. Optionally, the interlaced color image layer is defined according to a cyan, magenta yellow, and black (CMYK) color model or a red green blue (RGB) color model, so that each channel is converted to a sub-layer, according to a special screening process, for example as described below.

Optionally, as shown at 105 the printing blanket is fed with one or more coating materials (e.g. DuraGo™ or Topaz™) to set, also referred to herein as to load, a coating layer. The coating layer is allows the other layers to stick to the lenticular printing substrate during and/or after the impression. It is a well-known technique of coating lenticular lenses with special materials. It should be noted that as the adhesive materials are loaded to the printing blanket with the other layers before the impression operation, no designated coupling process is required. This simplifies the workflow and reduces costs.

Now, as shown at 106, the printing blanket that is loaded with the interlaced color image layer and the substantially nontransparent layer is used to impress the layers onto the back/printing side of the lenticular printing substrate, for example as known in the art. The layers are optionally coupled to the lenticular printing substrate by the adhesive materials.

In such an embodiment, the interlaced color image, the substantially nontransparent layer and optionally the adhesive coating are coupled to (also referred to as printing) the lenticular printing substrate in a single impression operation.

Figure 2:
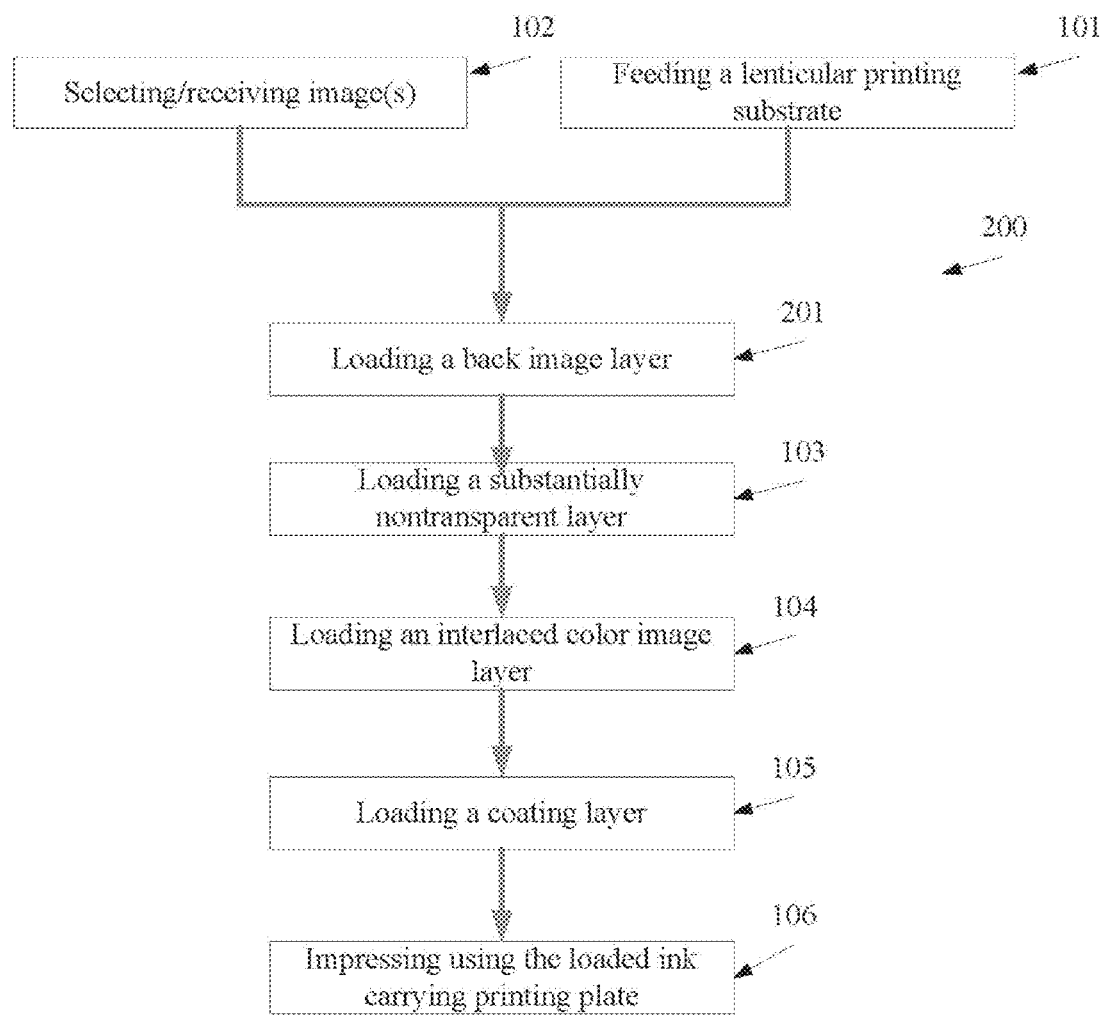
FIG. 2 is a flowchart of a method for a production of a duplex lenticular article by a single impression operation of a printing blanket of a digital printing press, according to some embodiments of the present invention.

Reference is now made to FIG. 2, which is a flowchart 200 of a method for a production of a duplex lenticular article in a process in which a lenticular printing substrate is printed with a back image, a substantially nontransparent layer, and an interlaced color image, by a single impression operation of a printing blanket of a printing press, according to some embodiments of the present invention. 101-106 are optionally as described with reference to FIG. 1; however, in this FIG. 2 a process of loading a back image layer to the printing blanket 201 is described. The added back image is designed to be viewed from the back of the generated lenticular article (i.e. not the corrugated side). The back image may be a trademark, visual data, textual data, a barcode, such as a QR code, and/or the like. For example, in the case of a lenticular article which is used as business cards, the back image layer may include contact details.

Figure 3:
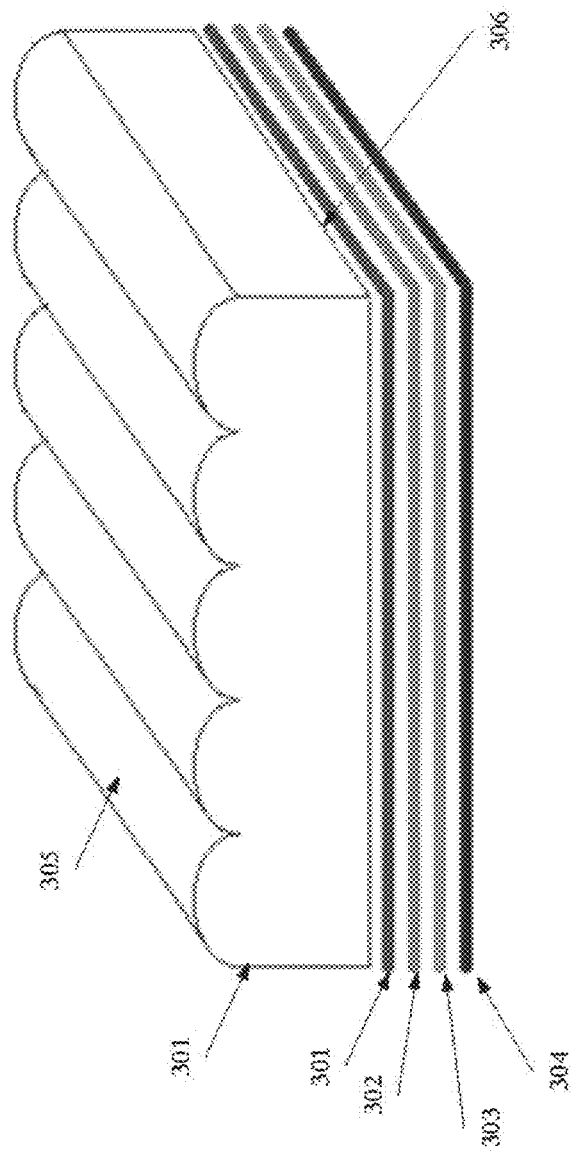
FIG. 3 is a schematic illustration of a lenticular article generated according to the process depicted in FIG. 2, according to some embodiments of the present invention.

Optionally, as shown at 201, one or more ink materials are fed to set a back image layer, optionally colored, on the printing blanket. The back image layer is optionally set according to a received image. For example, FIG. 3 is a schematic illustration of a lenticular article 301 generated according to the process depicted in FIG. 2, according to some embodiments of the present invention. The figure depicts a lenticular printing substrate 301 having a corrugated side 305 and a back side/printing side 306 coupled to a coating layer 301. On top of the coating layer 301, an interlaced color image layer 302 is layered. On top of the interlaced color image layer 302, one or more substantially nontransparent layers 303 are layered. On top of the one or more substantially nontransparent layers 303, a back image layer is layered.

It should be noted that the inks and adhesives which are described above are optionally fed onto the printing blanket by an ink feeding unit of the used printing press which is optionally a common ink feeding unit of a common printing press.

As described above, the interlaced color image layer, and optionally the back image layer, includes halftone pattern sublayers. The pattern sublayers (screening) can be implemented as a separate software package or within the printing press.

In the case of a separate software package, the received image is optionally a set of 1-bit image files. A correct tilting of the halftone patterns may have a substantial effect on the quality of the lenticular product as the lenses of the lenticular printing substrate 301 create a series of vertical and/or horizontal lines which is added to the halftone patterns. If the tilting of the halftone patterns in relation to the vertical and/or horizontal lines is not adjusted properly, a prominent moiré effect may be formed. A correct tilting may depend on print and lenses characteristics and optionally calculated separately per specific printing press and/or lens' pitch.

The inventors surprisingly found that the correct tilting that is required for reducing moiré effect in a lenticular article having a lenticular printing substrate with 75 lines per inch (LPI) (i.e. number of lenticular lenses) and a lenticular image printed using a printing press such as HP Indigo™ Digital Press printer, is:

15 degrees in relation to the longitudinal axis of the lenticular lenses of the lenticular printing substrate for a cyan colored halftone pattern;

75 degrees in relation to the longitudinal axis of the lenticular lenses of the lenticular printing substrate for a magenta colored halftone pattern;

30 degrees in relation to the longitudinal axis of the lenticular lenses of the lenticular printing substrate for a yellow colored halftone pattern; and 52.5 degrees in relation to the longitudinal axis of the lenticular lenses of the lenticular printing substrate for a black colored halftone pattern.

Figure 4:
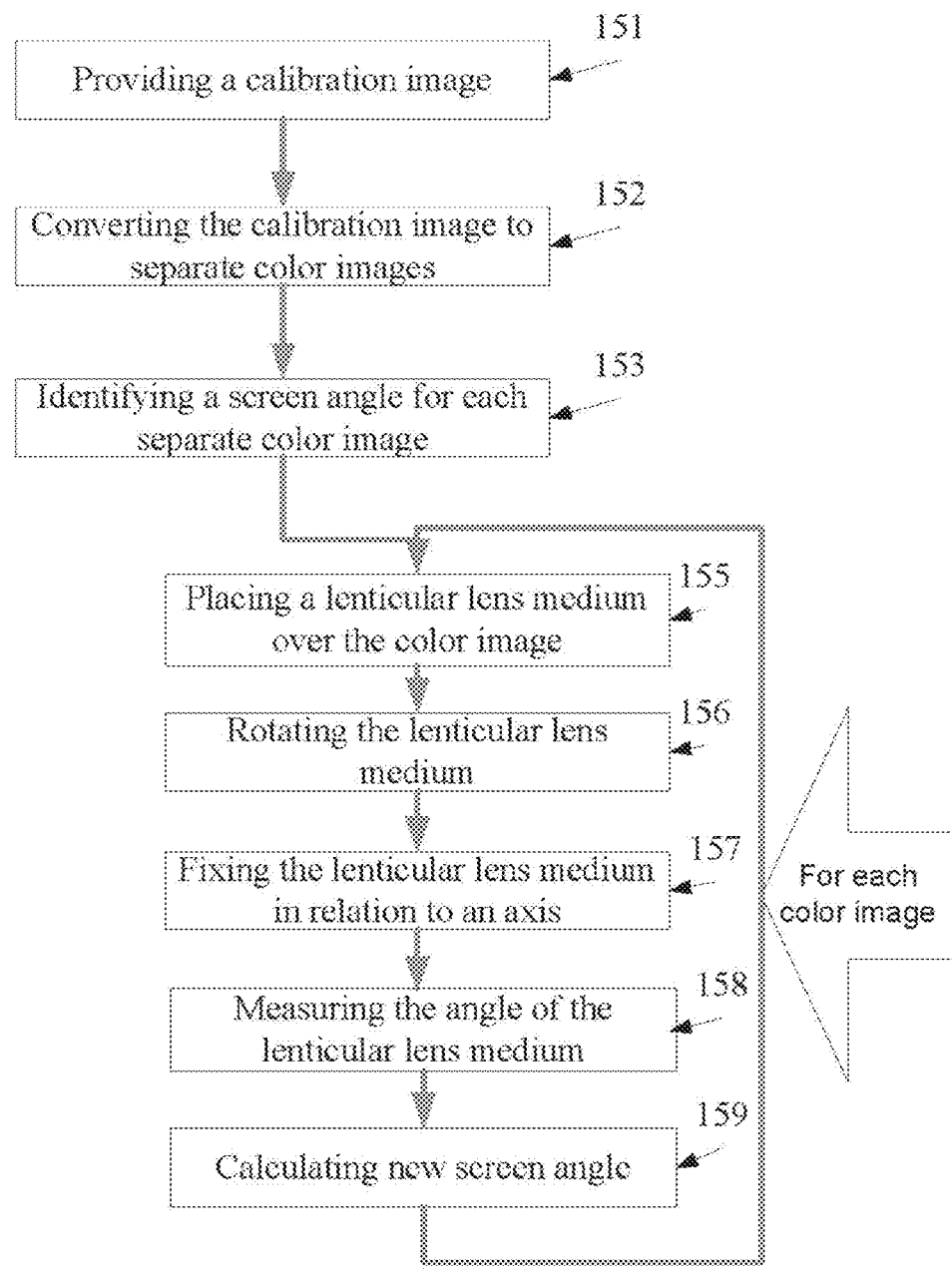
FIG. 4 is a flowchart of a method of calculating screen angles for colored halftone patterns, such as cyan, magenta, yellow, and black color model patterns, according to some embodiments of the present invention.
Figure 5A:
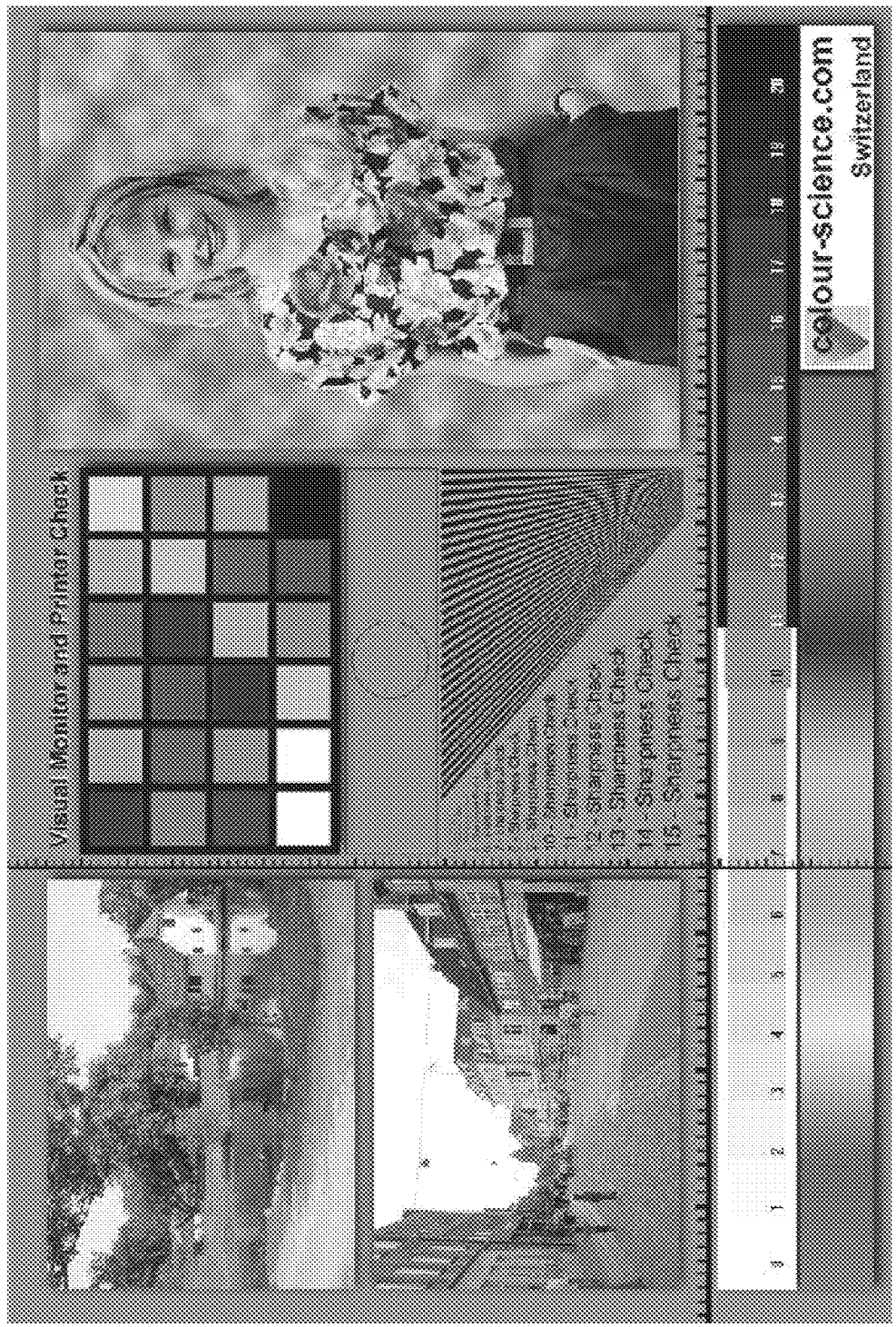
FIG. 5A is an exemplary and known calibration image.
Figure 5B:
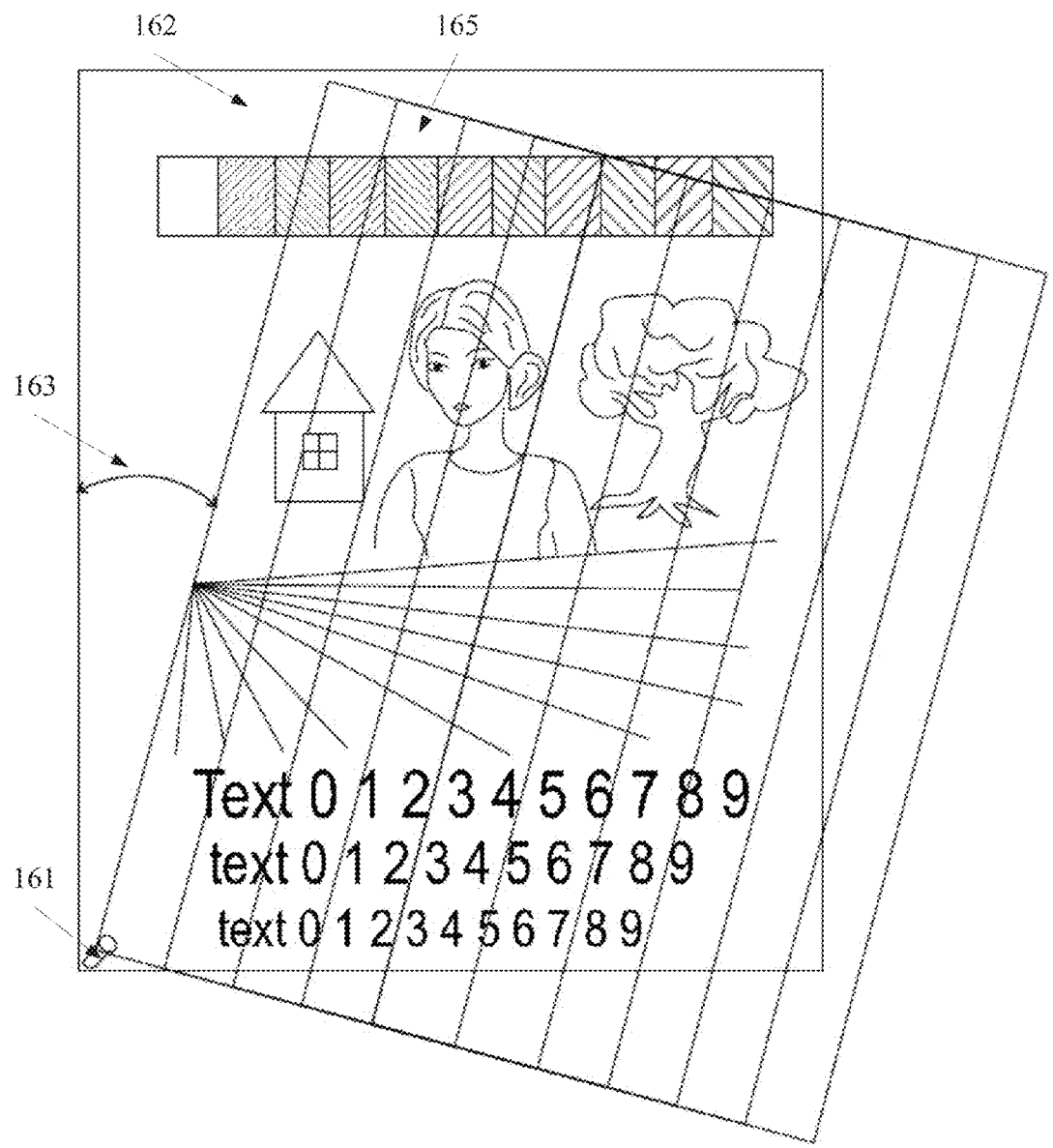
FIG. 5B is a schematic illustration of an exemplary lenticular lens medium which is turned in relation to a calibration image, according to some embodiments of the present invention.

According to some embodiments of the present invention, the tilting that is required for reducing moiré effect in a lenticular article having a lenticular printing substrate is calculated using a printer calibration image. For example, reference is now made to FIG. 4, which is a flowchart of a method of calculating screen angles for colored halftone patterns, such as cyan, magenta, yellow, and black color model patterns, according to some embodiments of the present invention. First, as shown at 151, a calibration image is selected, for example matched to the used printer from a plurality of representative printer calibration images, An exemplary and known calibration image is provided in FIG. 5A. Optionally, as shown at 152, if needed, the calibration image is adapted to the used color model by creating separate color images. For example, the calibration image is converted to CMYK color model by creating 4 separate color images (C, M, Y and K images). Now, as shown at 153, screen angles for colored halftone patterns are identified. Each one of the colored halftone patterns is set for another color. Optionally, the lenticular printing substrate has a line shaped screening of at least 200 LPI. Optionally, default screen angles are used for the calculation, for example the above screen angles (C:0; M:15; Y:45; K:75). For example 155-160, are performed for each color image. As shown at 155, a lenticular printing substrate 165 is placed in front of on the color image. If there's any artifact, the lens is rotated, clock-wise, as shown at 156, around a pivot, for example lenticular printing substrate 601 is rotated around pivot 161 in FIG. 5B and above the correlation image 162 until there's no artifact and/or to until the artifact is reduced to minimum. Then, as shown at 157, the angle 163 between the lenticular printing substrate 601 and the correlation image 162 is fixed (in relation to a reference axis). The rotation and/or fixation may be performed manually and/or automatically using a mechanical arm. Now, as shown at 159, the angle 163 between the left side of the calibration image (e.g. the paper) and the left side of the lenticular lens (before the rotation) is measured. The angle 163 may be referred to herein as Alfa(color channel), for example Alfa(Cyan) for the Cyan image or Alfa(Black) for the black image. Now, as shown at 159, a screen angle for the colored halftone pattern in the respective color is calculated by subtracting the Alfa(channel) value of the respective color from a respective default screen angle. After testing and calibration all color channels, the colored halftone patterns are generated and used for printing, for instance as described herein.

Figure 6:
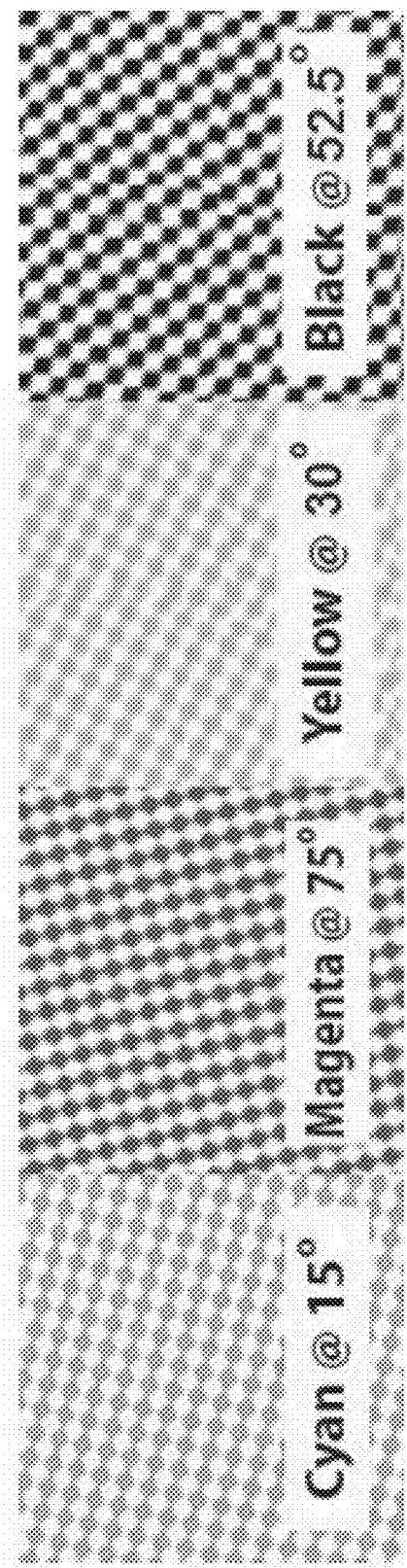
FIG. 6 is an exemplary schematic illustration of colored halftone patterns set according to some embodiments of the present invention.
Figure 7:
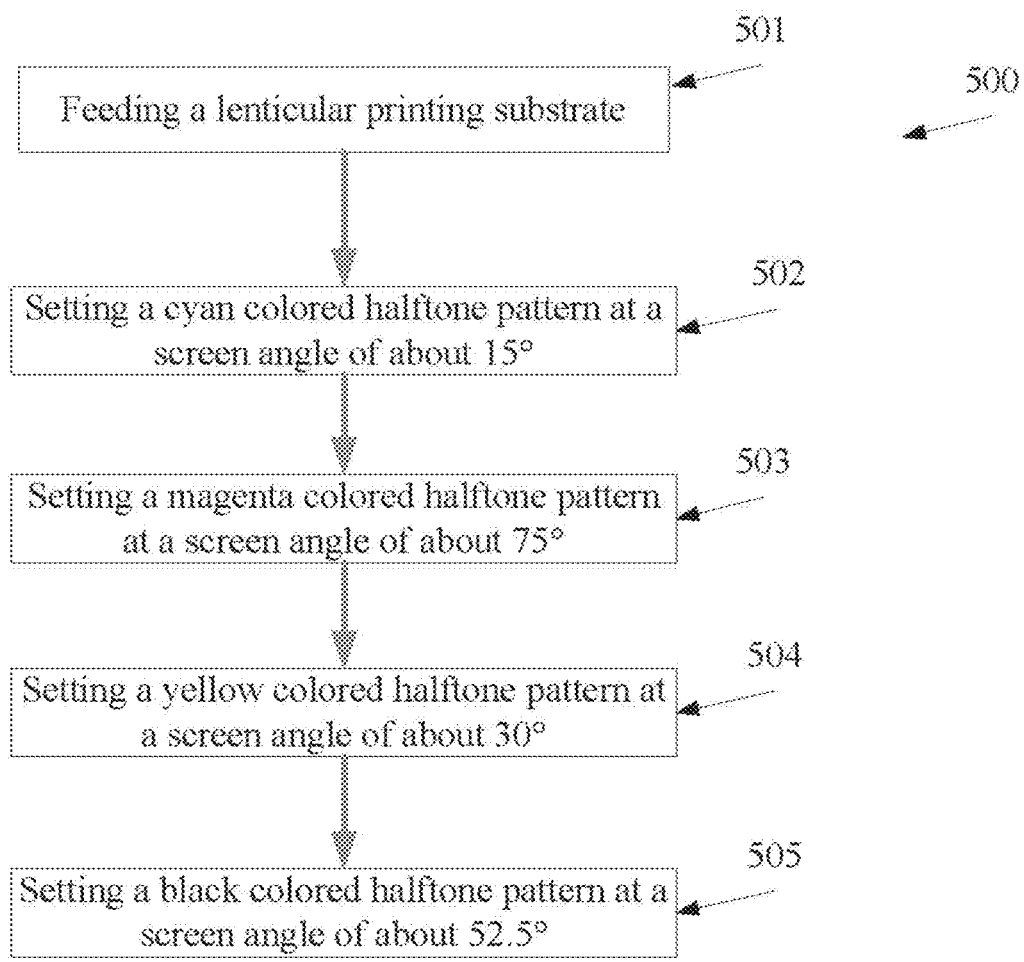
FIG. 7 is a flowchart of a process of generating a lenticular article, according to some embodiments of the present invention.

Reference is also made to FIG. 6, which is an exemplary schematic illustration of the above described colored halftone patterns, according to some embodiments of the present invention and to FIG. 7 which is a flowchart 300 of a process of generating a lenticular article, according to some embodiments of the present invention. First, as shown at 501, for example as described above in relation to 101, a lenticular printing substrate having a corrugated side and a printing side is fed into a printing press having a printing blanket. Then as shown at 502, a cyan color ink is fed to set a cyan colored halftone pattern having a screen angle of about 15 degrees on the printing blanket. Then as shown at 503, a magenta color ink is fed to set a magenta colored halftone pattern having a screen angle of about 75 degrees on said printing blanket. Then as shown at 504, a yellow color ink is fed to set a yellow colored halftone pattern having a screen angle of about 30 degrees on said printing blanket. Then as shown at 505, a black color ink is fed to set a black colored halftone pattern having a screen angle of about 52.5 degrees on said printing blanket. The screen angle is set in relation to a longitudinal axis of a lens of the lenticular printing substrate.

Figure 8:
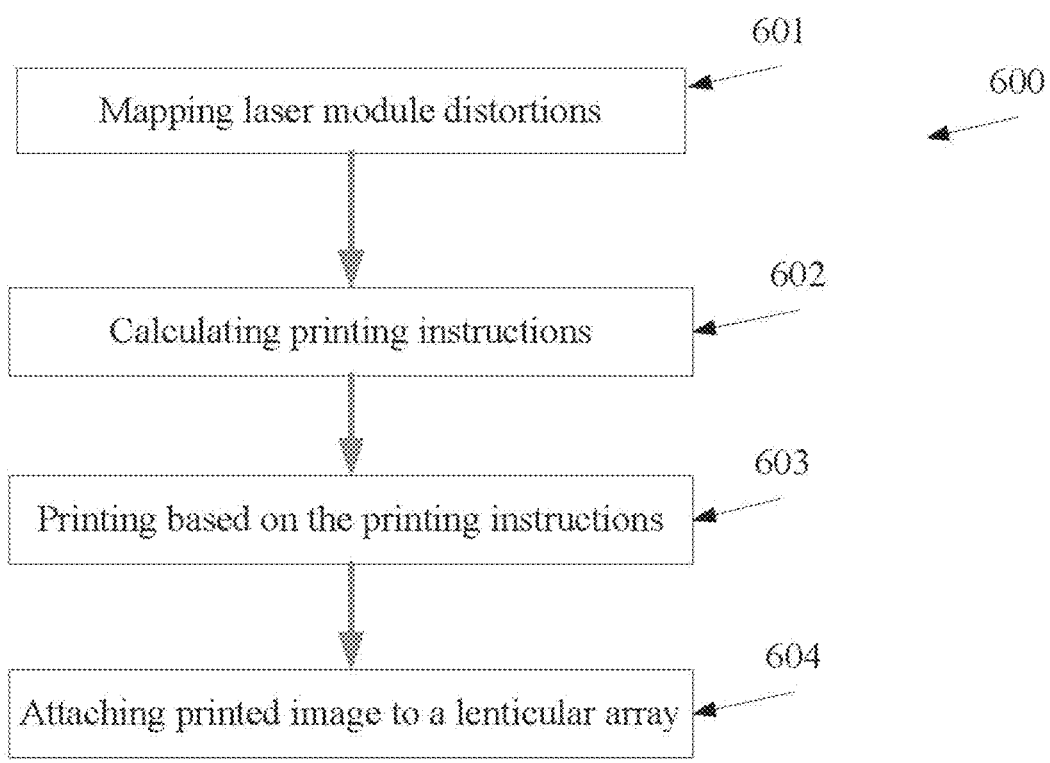
FIG. 8 is a flowchart of a method of adapting an interlaced color image to distortions caused by a laser module of a printing press used for printing the interlaced color image, according to some embodiments of the present invention.

According to some embodiments of the present invention, an interlaced color image, such as the above printed interlaced color image, is adapted according to distortions of a laser module of the printing press that is used for printing the interlaced color image. As commonly known, a laser module of a digital printing press is complicated machinery designed to create a static electricity layer of laser marks for drawing ink to the printing blanket before the impression operation. The distribution of the laser marks is imperfect because of various physical characteristics of the laser module. This imperfection may have a prominent effect in lenticular printing where a high precision is required. Reference is now made to FIG. 8, which is a flowchart 600 of a method of adapting an interlaced color image to distortions caused by a laser module of a printing press used for printing the interlaced color image, according to some embodiments of the present invention. The process may be implemented separately or as part of a lenticular article generation process, for as described in FIGS. 1 and 2 above.

Figure 9:
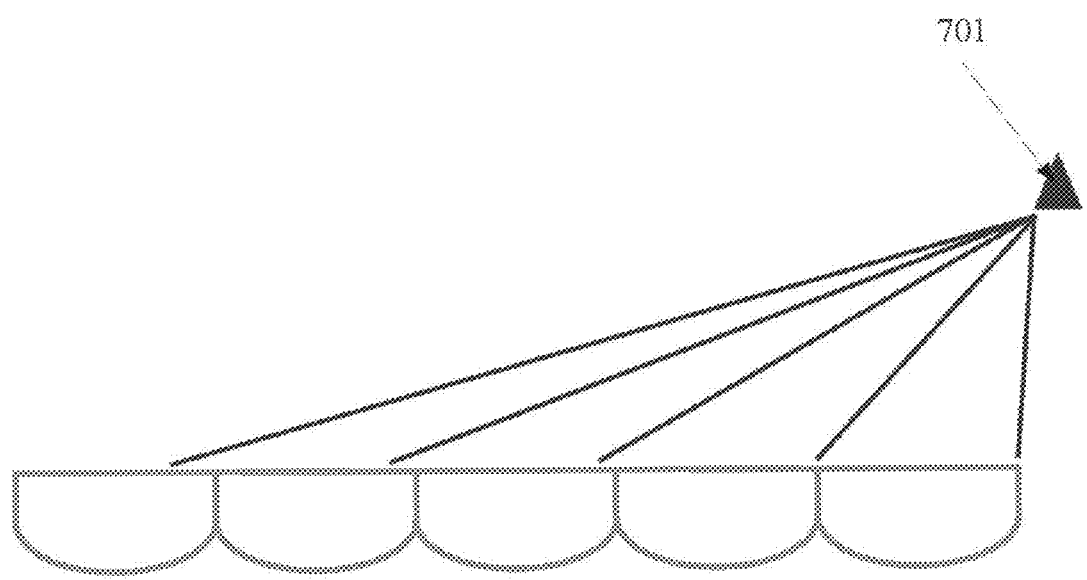
FIG. 9 depicts an exaggerated linear distortion pattern, according to some embodiments of the present invention.

First, as shown at 601, distortions in a laser pattern projected on a printing blanket of a printing press are identified. Linear distortions may be calculated monotonically depending on a distance from a specific reference location on the printing blanket. For example, FIG. 9 depicts an exaggerated linear distortion pattern, where the laser rays, marked by lines originated from a triangle 701, create increasingly larger distortions depending on the distance between their source and the lenses on a lenticular sheet. Non-linear distortions may be calculated according to a predictable pattern identified by an analysis of a reference printout generated by the printing press.

Now, as shown at 602, printing instructions for printing an interlaced color image having a plurality of image strips with a variable width is calculated according to the distortions in light of the pitch of the lenses of the lenticular printing substrate. As used herein, an image strip is a strip of visual data set to be imaged by a respective lens of a lenticular printing substrate.

The calculation optionally induces adjustment instructions that adjust the pitch of the interlaced color image according to a corresponding estimated location on the printing blanket and the anticipated distortion of its pitch. Reference is now made to an exemplary calculation. If the lens pitch is 75.1 mm and the printing press blanket a distortion that distorts a printing pitch by +0.2 mm is identified on the right third, and an adjusted pitch of 74.9 mm may be calculated to the right third of the interlaced color image. A standard pitch of 75.1 mm may used for the left two thirds of the interlaced lenticular image. This adjusted pitch anticipates it to be enlarged because of the distortion to the native pitch of 75.1 mm. The distortions may change more frequently, and ultimately the pitch might be adjusted per each single lens on a lenticular sheet.

Now, the printing instructions may be used for printing an adjusted interlaced color image, as shown at 703. As shown at 704, the adjusted interlaced color image is coupled with a lenticular array having a uniform pitch, for example as known in the art.

It is expected that during the life of a patent maturing from this application many relevant systems and methods will be developed and the scope of the term a module, a processor, and a system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for a production of a lenticular image, comprising:
   feeding a lenticular printing substrate having a corrugated side and a printing side into a digital printing press;
   feeding at least one nontransparent ink to set a substantially nontransparent layer on a printing blanket of said printing press;
   feeding a plurality of colored inks to set an interlaced color image layer on top of said substantially nontransparent layer on said printing blanket;
   feeding at least one colored ink to set a lenticular article back image layer on said printing blanket, said feeding at least one colored ink is performed to set said substantially nontransparent layer on top of said lenticular article back image layer; and
   printing with said printing blanket in a single impression operation into said printing side.

2. The method of claim 1, further comprising feeding at least one coating material to set a coating layer on top of said interlaced color image layer on said printing blanket.

3. The method of claim 1, wherein said feeding a plurality of colored inks comprises feeding said plurality of colored inks to form a cyan color component layer, a magenta color component layer, a yellow color component layer, and a black color component layer on top of said substantially nontransparent layer on said printing blanket.

4. The method of claim 1, wherein said feeding a plurality of colored inks comprises feeding said plurality of colored inks to form a red color component layer, a green color component layer, and a blue color component layer on top of said substantially nontransparent layer on said printing blanket.

5. The method of claim 1, wherein said feeding plurality of colored inks comprises feeding a cyan color ink to set a cyan colored halftone pattern having a screen angle of about 15 degrees on said printing blanket, feeding a magenta color ink to set a magenta colored halftone pattern having a screen angle of about 75 degrees on said printing blanket, feeding a yellow color ink to set a yellow colored halftone pattern having a screen angle of about 30 degrees on said printing blanket, and feeding a black color ink to set a black colored halftone pattern having a screen angle of about 52.5 degrees on said printing blanket; wherein said screen angle is set in relation to a longitudinal axis of a lens of said lenticular printing substrate.

6. The method of claim 1, wherein said lenticular printing substrate is a lenticular array having a plurality of lenses.

7. The method of claim 1, wherein said feeding a plurality of colored inks comprises:
   feeding a cyan color ink to set a cyan colored halftone pattern having a screen angle of about 15 degrees on said printing blanket;
   feeding a magenta color ink to set a magenta colored halftone pattern having a screen angle of about 75 degrees on said printing blanket;
   feeding a yellow color ink to set a yellow colored halftone pattern having a screen angle of about 30 degrees on said printing blanket; and
   feeding a black color ink to set a black colored halftone pattern having a screen angle of about 52.5 degrees on said printing blanket;
   wherein said screen angle is set in relation to a longitudinal axis of a lens of said lenticular printing substrate.

8. A method for a production of a lenticular image, comprising:
   feeding a lenticular printing substrate having a corrugated side and a printing side into a digital printing press;
   feeding at least one nontransparent ink to set a substantially nontransparent layer on a printing blanket of said printing press;
   feeding a plurality of colored inks to set an interlaces color image layer on top of said substantially nontransparent layer on said printing blanket;
   printing with said printing blanket in a single impression operation onto said printing side;
   wherein said feeding a plurality of colored inks comprises mapping a plurality of distortions in a laser pattern projected on said printing blanket, calculating printing instructions for performing said feeding a plurality of colored inks so that said interlaced color image layer having a plurality of image strips with a variable location and width set according to said plurality of distortions.

9. A method for a production of a lenticular image, comprising:
   feeding a lenticular printing substrate having a corrugated side and a printing side into a digital printing press;
   feeding at least one nontransparent ink to set a substantially nontransparent layer on a printing blanket of said printing press;

feeding a plurality of colored inks to set an interlaces color image layer on top of said substantially nontransparent layer on said printing blanket;

calculating a plurality of halftone feeding patterns each to another of a plurality of colored inks, each said halftone feeding pattern is calculated by measuring in which tilt angle a reference lenticular printing substrate is mounted in relation to a correlation image of a respective color from said the colors of said plurality of colored inks to reduce an artifact; and printing with said printing blanket in a single impression operation onto said printing side.

10. The method of claim 9, wherein said calculating further comprises subtracting said tilt angle from a default reference angle.

11. The method of claim 9, wherein said each said halftone feeding pattern is calculated by measuring in which tilt angle between said lenticular printing substrate and said correlation image an artifact is reduced.

12. The lenticular article of claim 9, wherein said interlaced color image combines a cyan colored halftone pattern, a magenta colored halftone pattern, a yellow colored halftone pattern, and a black colored halftone pattern respectively having a screen angle of about 15 degrees, about 75 degrees, about 30 degrees and about 52.5 degrees;

wherein said screen angle is set in relation to a longitudinal axis of a lens of said lenticular printing substrate.

13. The lenticular article of claim 9, wherein said interlaced color image layer and said substantially nontransparent layer are printed in a common impression operation onto said printing side by said digital press.

14. A digital printing press for a production of a lenticular image, comprising:

a printing blanket; and a printing substrate conveying unit which conveys a lenticular printing substrate having a corrugated side and a printing side in front of said printing blanket;

an ink feeding unit which feeds:
at least one nontransparent ink to set a substantially nontransparent layer on a printing blanket of said printing press and feeds a plurality of colored inks to set an interlaced color image layer on top of said substantially nontransparent layer on said printing blanket, and at least one colored ink to set a lenticular article back image layer on said printing blanket wherein said at least one colored ink is fed to set said substantially nontransparent layer on top of said lenticular article back image layer;

wherein said printing blanket is used to print said interlaced color image layer and said substantially nontransparent layer onto said printing side in a single impression operation.

15. A method adapting an interlaced color image, comprising:

mapping a plurality of distortions in a laser pattern projected on a printing blanket of a digital printing press;

calculating printing instructions for printing an interlaced color image on a lenticular printing substrate having a plurality of lenses, said interlaced color image with a plurality of image strips adapted to said plurality of lenses and a variable width set according to said plurality of distortions;

using said printing press for printing said interlaced color image according to said printing instructions; and attaching said interlaced color image to a lenticular array having a uniform pitch.

16. A lenticular article, comprising:

a lenticular printing substrate having a corrugated side with a uniform pitch and a back side; and and interlaced color image having a plurality of image strips with different locations and widths selected according to a plurality of distortions in a laser pattern projected on a printing blanket of a printing press used for printing said interlaced color image;

wherein said interlaced color image is attached to said back side.

* * * * *